United States Patent [19]

Bolin et al.

[11] Patent Number: 4,550,219

[45] Date of Patent: Oct. 29, 1985

[54] MODULARLY CONSTRUCTED GAS-INSULATED TRANSMISSION LINE, AND METHOD OF ASSEMBLING SAME

[75] Inventors: Philip C. Bolin, Wilkins Township, Allegheny County, Pa.; Gary K. Bowman, Westborough, Mass.; Charles S. Ellis, Norcross, Ga.; Melvyn D. Hopkins, North Grafton; Richard E. Kane, Northborough, both of Mass.

[73] Assignee: Westinghouse Electric Corp., Pittsburgh, Pa.

[21] Appl. No.: 722,569

[22] Filed: Apr. 11, 1985

[51] Int. Cl.[4] .................. H01B 9/06; H02G 5/06; H02G 15/24

[52] U.S. Cl. .................. 174/21 C; 29/828; 174/14 R

[58] Field of Search ............ 174/14 R, 21 R, 21 C, 174/21 JS, 22 C, 28, 99 B; 29/828

[56] References Cited

U.S. PATENT DOCUMENTS

| | | | |
|---|---|---|---|
| 4,105,859 | 8/1978 | Cookson et al. | 174/14 R |
| 4,111,511 | 9/1978 | Bolin | 339/255 R X |
| 4,161,621 | 7/1979 | Bolin et al. | 174/14 R |
| 4,335,268 | 6/1982 | Dale | 174/14 R |
| 4,370,513 | 1/1983 | Kommineni | 174/21 JS |
| 4,501,466 | 2/1985 | Meyer | 339/255 P |

FOREIGN PATENT DOCUMENTS 54-136632 10/1979 Japan .................. 174/21 C

*Primary Examiner*—Laramie E. Askin
*Attorney, Agent, or Firm*—M. S. Yatsko

[57] ABSTRACT

An improved gas-insulated transmission line is disclosed in which the transmission line itself is constructed in a modular fashion from elements which are joined together, typically at the final installation location, to form the transmission line. The other sheath and the inner conductor can be fabricated separately, at different locations and by different manufacturers, and transmitted to the point of final assembly and installation. A backup ring, insulator support assembly, contact shield, and connection member are separately fabricated into a single modular member, which can by itself be subjected to the testing procedures normally undertaken at the factory. This modular member, after satisfactorily passing its acceptance test, can then be shipped to the installation site. The installation of the transmission line, and formation thereof, can then be performed by inserting the inner conductor into the connection member portion of the modular member, and the outer sheath segments can then be physically connected to the backup ring portion of the modular member to form the transmission line.

3 Claims, 4 Drawing Figures

MODULARLY CONSTRUCTED GAS-INSULATED TRANSMISSION LINE, AND METHOD OF ASSEMBLING SAME

CROSS-REFERENCE TO RELATED APPLICATIONS

Reference is made to copending application Ser. No. 722,568, filed Apr. 11, 1985, entitled "Insulating Spacer Design for a Modular Gas-Insulated Transmission Line" by Bolin et al., assigned to the same assignee as the present invention.

BACKGROUND OF THE INVENTION

This invention relates generally to electrical apparatus, and more particularly, to a compressed gas-insulated transmission line made from a modular construction.

Compressed gas-insulated power transmission lines are a relatively recent commerical product which is gaining increased acceptance by the electric utility industry as an economical means for transmitting large blocks of electrical energy, and for use in special applications where conventional power transmission lines are inadequate. A typical compressed gas-insulated transmission line is comprised of an elongated outer sheath having disposed therein an inner conductor at high potential, with means disposed in the outer sheath to insulatably support the inner conductor within the outer sheath. An insulating gas, typical of which is sulfur hexafluoride at a pressure of 50 psi gauge, is utilized for electrically insulating the inner conductor from the outer sheath. Particle traps may be utilized to trap and deactivate contamination particles which may be present within the outer sheath. The inner conductor is typically used to transmit energy at voltage ranges from 121–1200 kV. Both the inner conductor and the outer sheath are of good electrically conducting materials such as aluminum.

One of the drawbacks of gas-insulated power transmission lines which is hindering even more widespread application of the lines is associated with the cost of the lines. If the cost of manufacturing and installing the gas-insulated transmission lines were further reduced, these lines would be more competitive with conventional power transmission lines for more and more installations.

SUMMARY OF THE INVENTION

An improved gas-insulated transmission line is disclosed in which the transmission line itself is constructed in a modular fashion from elements which are joined together, typically at the final installation location, to form the transmission line. The outer enclosure, or sheath, and the inner conductor can be fabricated separately, at different locations and by different manufacturers, and transmitted to the point of final assembly and installation. A backup ring, insulator support assembly, contact shield, and connection member are separately fabricated into a single modular member, which can by itself be subjected to the testing procedures normally undertaken at the factory. This modular member, after satisfactorily passing its acceptance test, can then be shipped to the installation site. The installation of the transmission line, and formation thereof, can then be performed by inserting the inner conductor into the connection member portion of the modular member, and the outer sheath segments can then be physically connected to the backup ring portion of the modular member to form the transmission line.

BRIEF DESCRIPTION OF THE DRAWINGS

Reference is now made to the description of the preferred embodiment, illustrated in the accompanying figures, in which.

DESCRIPTION OF THE PREFERRED EMBODIMENTS

Figure 1:
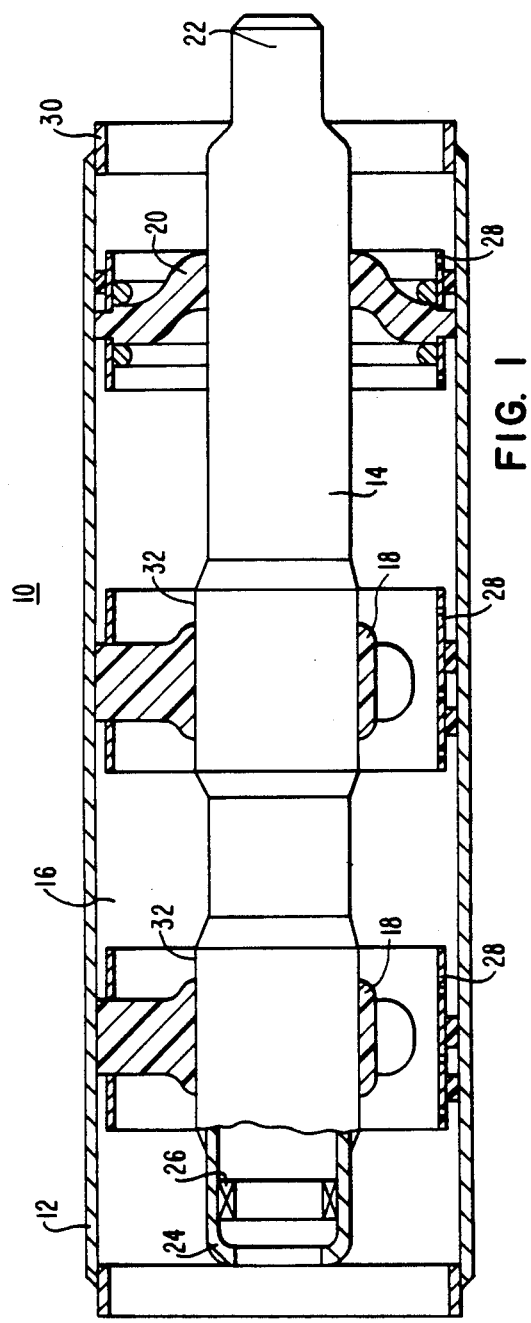
FIG. 1 is a view, partially in section and partially in elevation, of a typical prior art gas-insulated transmission line.

Referring now more particularly to FIG. 1, therein is shown a typical gas-insulated transmission line 10 as assembled in the prior art. The transmission line 10 illustrated would typically have been entirely constructed at the manufacturing location, tested as a unit, and then shipped to the installation site. The transmission line 10 is comprised of an outer enclosure or sheath 12, an interiorly disposed unitary inner conductor 14, an insulating gas 16 typical of which is sulfur hexafluoride, and a plurality of insulating support members 18, 20. The inner conductor 14 would have a plug member 22 disposed at one end thereof, and a corresponding socket member 24, with a plurality of contact fingers 26 disposed therein, for joining together a plurality of like sections of transmission line 10. Surrounding each insulating spacer 18, 20 would typically be a particle trapping ring 28. A welding backup ring 30 would be disposed at either end of the outer sheath section 12, to enable adjacent outer sheath sections 12 to be welded together. A more complete description of this type of prior art transmission line can be found, for example, in U.S. Pat. No. 4,105,859.

The transmission line 10 illustrated in FIG. 1 would typically be completely constructed at the manufacturing location. For example, the insulating spacers 18, of the tri-post variety, would have been cast onto a metal sleeve 32 which, in turn, would have been welded onto the tubular inner conductor 14; the conically-shaped insulating spacer 20 might, for example, be directly cast onto the inner conductor 14. After the insulating supports 18, 20 were secured to the inner conductor 14, this entire assemblage would be inserted within the outer, tubular sheath 12. After having inserted therein the insulating gas 16, the complete assembly would then be tested to purchaser specifications at the manufacturing facility. After completion of the testing, the entire unit, which would typically be on the order of 60 feet long, would be sealed and transported to the installation site, where adjacent sections would be secured together to form the complete transmission line.

Figure 2:
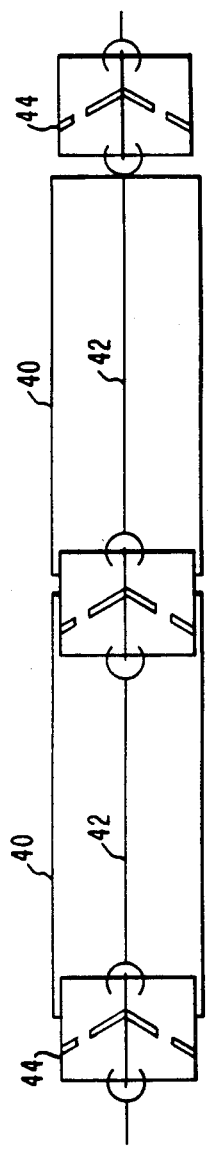
FIG. 2 is a schematic illustration showing the modular construction of a gas-insulated transmission line according to the teachings of this invention.

As contrasted with the above-described prior art transmission line, significant cost savings can be anticipated with the use of the modular transmission line schematically illustrated in FIG. 2. Utilizing this modular assembly technique, the various elements of the transmission line can be constructed at the most economical location, tested at the location separately, and eventually put together at the location of the transmission line installation.

Economic advantages are achieved since testing, transportation, etc. do not involve long lengths of line but instead only smaller modular elements. Furthermore, detail work involving the insulating supports, particle traps, shields and the like are not required to be performed inside the outer sheath, easing the labor effort. Additionally, the manufacture of the separate modular elements can be performed by those most familiar and knowledgeable in the field; that is, the sheath and inner conductor can be made by companies who specialize in making pipe, while the manufacture of the more technologically difficult modular connector element can be performed by those specializing in that area.

According to this construction, the outer sheath segments 40, of a generally tubular configuration, and the inner conductor segments 42 can be manufactured separately from the manufacture of the insulator-trap modular element 44. For example, the modular element 44 could be manufactured at a manufacturing location in the United States, tested and shipped from there, whereas the outer sheath 40 and the inner conductor 42 could be manufactured in a completely different country, and then these elements joined together to form the transmission line at the installation site. Not only is this assembly technique more economical, but it also enables the maximum use of local manufacturing facilities, which may be important in certain countries having local content legislation.

Figure 3:
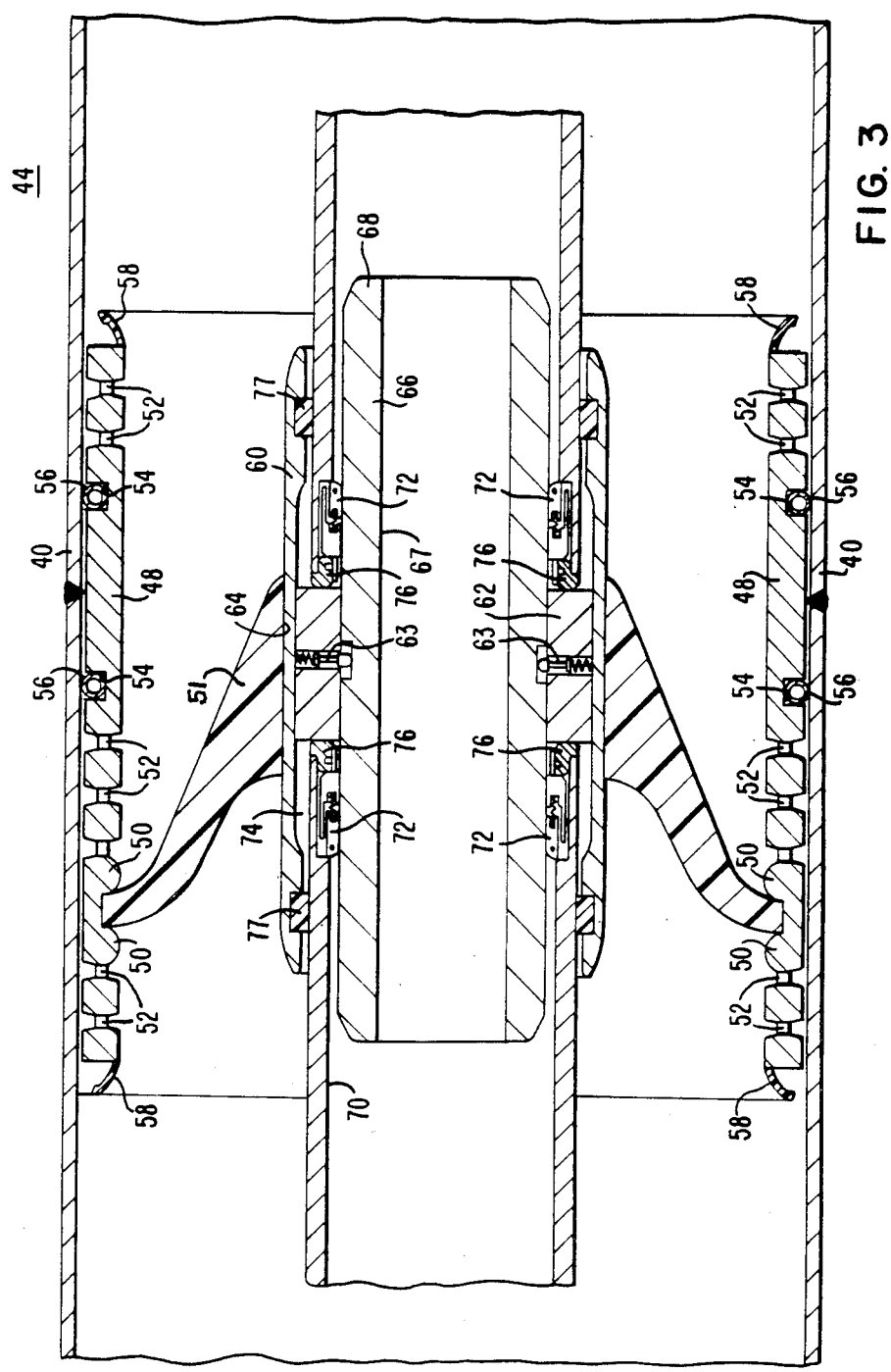
FIG. 3 is a detailed, cross-sectional view of the modularly constructed support and connection member.
Figure 4:
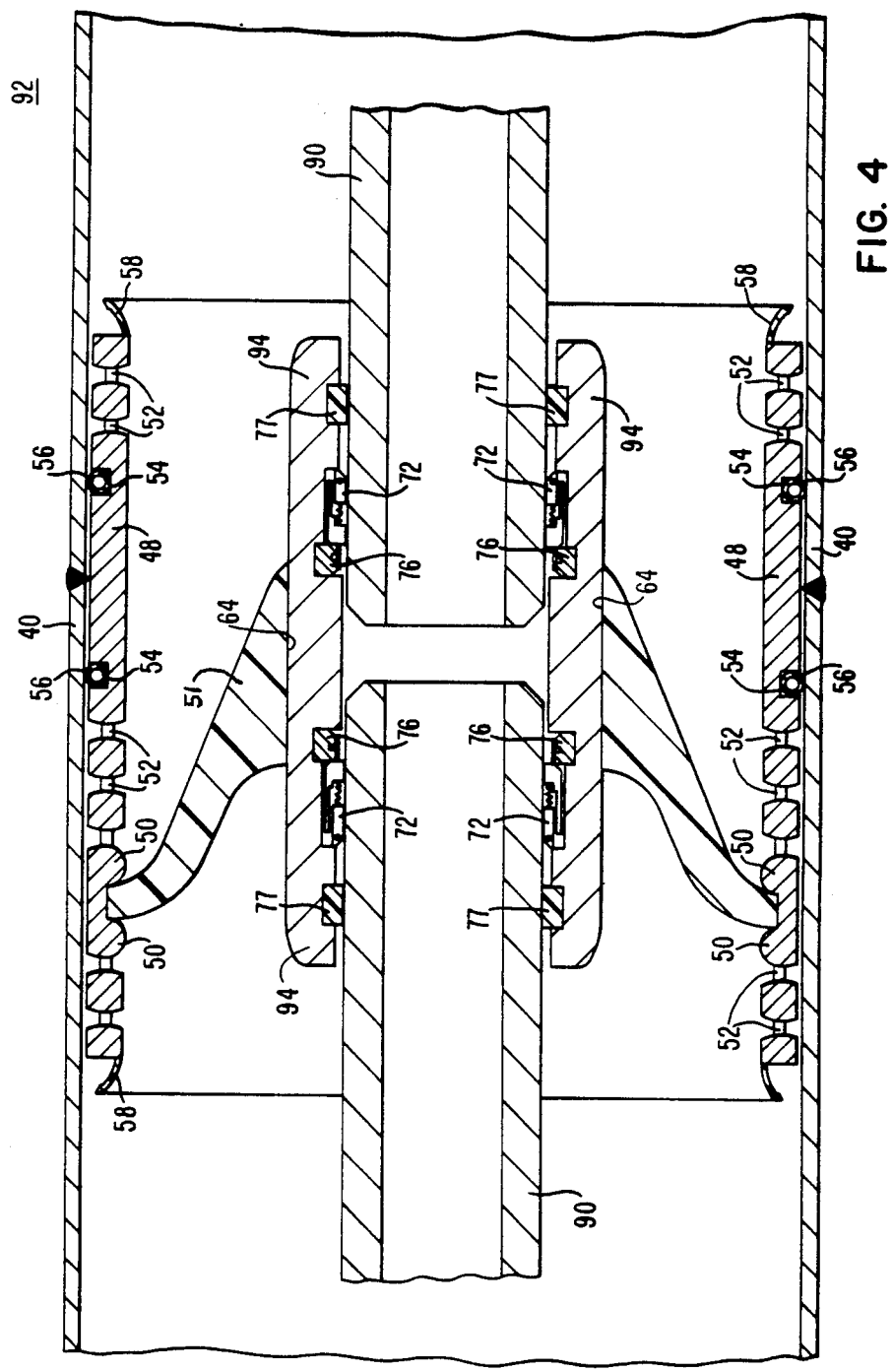
FIG. 4 illustrates a modification of the support member shown in FIG. 3.

As shown schematically in FIG. 2, and in cross-sectional detail in FIGS. 3 and 4, each outer sheath segment 40 would be of a hollow, elongated tubular construction of a good electrically conducting material such as aluminum. The inner conductor sections 42, again of generally tubular construction, would have at either end thereof a socket section 70 (FIG. 3) or a plug section 90 (FIG. 4). The purpose of these plugs or sockets, or a combination thereof, is to enable the various inner conductor sections 42 to be connected to each other through the modular element 44, as will hereinafter be explained. The joint backup ring, insulating support, shield and connector modular member is illustrated in greater detail in FIG. 3.

In FIG. 3, it can be appreciated that the modular element 44 is initially comprised of a cylindrical or tubular, hollow welding backup ring 48. The backup ring 48 is elongated and has a pair of spaced-apart enlarged portions 50, spaced apart a distance so as to hold securely between the portions 50 the conical insulating support 51. The backup ring 48 would typically have a plurality of slots or holes 52 therethrough for the entrapment of contamination particles. The backup ring 48 would also have a pair of spaced-apart circumferential grooves 54 therein for the insertion of seals 56. At either longitudinal end of the backup ring would be provided dielectric lip members 58. The backup ring 48 may be constructed as illustrated in U.S. Pat. No. 4,161,621, which is hereinto incorporated. Details of the dielectric lips 58 can be found, for example, in U.S. Pat. No. 4,335,268.

Held between the enlarged portions 50 is a generally conically-shaped insulating support 51 which will eventually provide support for the inner conductor 42. The insulating support is typically of an epoxy material exhibiting good arc and track resistance properties, particularly in an atmosphere of arced sulfur hexafluoride gas.

The inner circumference 64 of the insulator 51 is preferably cast directly onto a tubular or cylindrical contact shield 60. The contact shield 60 is in turn fixedly secured to a cylindrical or tubular support ring 62 by means such as the fasteners 63. The support ring 62 is fixedly secured to the connecting member 66 which preferably has plug members 68 at both longitudinal ends thereof. The plug members 68 are sized so as to mate with the socket ends 70 of the inner conductor sections 42. The support ring 62, in addition to supporting the connecting member 66, also functions to provide adequate radial spacing between the plug members 68 and the contact shield 60 to enable the socket ends 70 to be disposed therebetween. A plurality of current-carrying finger contacts 72, details of which may be found in U.S. Pat. No. 4,501,466, are disposed within the space 74 between the contact shield 60 and the plug members 68, and are disposed in openings formed on the interior surface of the socket members 70. Retainers 76 are used to secure the contacts 72 to the socket members 70.

Assembly of the modular transmission line can subsequently proceed, preferably at the location of final installation. A suitable number of modular elements 44, outer sheath segments 40, and inner conductor segments 42 are transported to the installation site. Two inner conductor segments 42 are inserted into the modular element 44, with the sockets 70 at the end of the two inner conductor sections 42 being inserted within the space 74 until such time as good electrical contact is made between the plug members 68 and the finger contacts 72. Electrical connection through the inner conductor is then through the inner conductor segment 42, the socket 70, the finger contact 72, the plug member 68, the intermediate connecting section 67 between the two plug ends 68, the other plug end 68, the finger contact 72, and the socket 70 of the adjacent inner conductor section 42. The contact shield 60 provides electrical shielding of the joint between the two inner conductor sections 42 when energized, while the wiper seals 77 prevent any particles which may be generated from contaminating the rest of the transmission line.

After the inner conductor sections are connected, two outer sheath sections 40 are inserted over the inner conductor sections 42 and are placed over the welding backup ring 48. Each outer sheath section 40 is then welded to the backup ring 48 and to each other. The seals 56 function to prevent the ingress of any weld splatter into the main interior section of the transmission line.

After the outer sheath sections have been welded, insulating gas can then be inserted into the interior of the outer sheath sections 40 through appropriate valve means (not shown). To make longer or different sized transmission lines, additional outer sheath sections 40, inner sheath sections 42, and modular elements 44 can be assembled as herein described, as needed.

Referring now to FIG. 4, therein is shown a modified modular element 92. In this modification, the contact shield 94 also functions as a current-carrying socket member. The finger contacts 72 are disposed in openings formed in the interior surface of shield 94. The ends of the inner conductor sections 42 are formed in the shape of plugs 90. These plug ends 90 are then inserted within the shield 94 until electrical contact can be made through the finger contacts 72. Electric current flow in this case is then from the plug 90 through the contacts 72, the shield 94, the contacts 72, and the other plug 90. In this modification, the shield 94 provides not only support and electrical shielding, but also a current-carrying path.

As can be readily appreciated, the gas-insulated transmission line according to the teachings of this invention provides for a modular construction which can be accomplished at diverse manufacturing locations which are only required to be joined together at the location of the final installation.

We claim:

1. A method of assembling a gas-insulated transmission line comprising:
    (a) assembling as a modular member a backup ring, an insulating support held by said backup ring, and a connection member supported by said insulating support;
    (b) connecting both electrically and physically two inner conductor sections to said connection member;
    (c) gas-tightly securing two outer sheath sections to each other and to said backup ring; and
    (d) inserting an insulating gas within said outer sheath sections.

2. A gas-insulated transmission line comprising:
    a modular member comprising a backup ring, an insulating support held by said backup ring, and a connection member supported by said insulating support;
    two inner conductor sections electrically connected to each other by said connection member and physically supported by said insulating support through said connection member;
    two outer sheath sections gas-tightly secured to said backup ring and each other, said outer sheath sections enclosing said inner conductor sections and said modular member; and
    an insulating gas electrically insulating said inner conductor sections from said outer sheath sections.

3. A method of assembling a transmission line comprising:
    (a) assembling as a modular member a backup ring, an insulating support by held by said backup ring, a contact shield physically supported by said insulating support, and a connection member having two plug members at the ends thereof secured within said contact shield;
    (b) connecting both electrically and physically two socket ends of two inner conductor sections to said plug members within said contact shield; and
    (c) securing two outer sheath sections to each other and said backup ring and enclosing said modular member and said inner conductor sections.

* * * * *